United States Patent [19]

Suzuki

[11] Patent Number: 4,868,811
[45] Date of Patent: Sep. 19, 1989

[54] MULTIPLE ACCESS COMMUNICATION SYSTEM

[75] Inventor: Hideo Suzuki, Kawasaki, Japan

[73] Assignee: Kabushiki Kaisha Toshiba, Kawasaki, Japan

[21] Appl. No.: 161,761

[22] Filed: Feb. 29, 1988

[30] Foreign Application Priority Data

Mar. 10, 1987 [JP] Japan ............................. 62-053014
Sep. 28, 1987 [JP] Japan ............................. 62-240839

[51] Int. Cl.⁴ .............................................. H04J 4/00
[52] U.S. Cl. ......................................... 370/50; 370/76
[58] Field of Search ................. 370/69.1, 76, 110.1, 370/104, 120, 121, 71, 50, 60, 94

[56] References Cited

U.S. PATENT DOCUMENTS

| 4,339,816 | 2/1982 | Reed | 370/76 |
| 4,590,595 | 5/1986 | Morimura | 370/76 |
| 4,688,216 | 8/1987 | Saburi | 370/104 |

OTHER PUBLICATIONS

Fujii, et al., "AA/TDMA—Adaptive Satellite Access Method for Mini-Earth Station Networks," Proceedings of the GLOBECOM, 1986, pp. 42.4.1–42.4.6

Primary Examiner—Joseph A. Orsino
Assistant Examiner—Frank M. Scutch, III
Attorney, Agent, or Firm—Foley & Lardner, Schwartz, Jeffery, Schwaab, Mack, Blumenthal & Evans

[57] ABSTRACT

A multiple access communication system performs the communication between plural communicating units using plural communicating channels and a common signalling channel for establishing and releasing the communicating channels. The communication system comprises the steps of allocating at least one carrier frequency to the common signalling channel; allocating the carrier frequencies, which are different from the carrier frequency alloted to the common signalling channel, to the communicating channels; forming a time frame composed of first and second time slots by the common signalling channel and communicating channel, respectively; and allocating the first time slot to at least the common signalling channel and the second time slot to the communicating channel.

A multiple access communication system performs the communication between plural communicating units by selectively allocating plural carrier frequencies, which are different from the common signalling channel carrier frequency, to the plural communicating channels, and using a common signalling channel for establishing and releasing the communicating channels. The commnication system comprises the steps of constituting a time frame of communicating channel by at least one packet; selecting transmission parameters of the communicating channel including at least transmission speed, packet length and packet position from plural transmission parameters prepared in advance; and setting the selected transmission parameters through the common signalling channel.

16 Claims, 8 Drawing Sheets

MULTIPLE ACCESS COMMUNICATION SYSTEM

The present invention relates to multiple access communication systems used in the fields of satellite communications, subscriber's radio communications, digital mobile communications, local area networks, and so on.

BACKGROUND OF THE INVENTION

In multiple access communication systems, carrier frequencies or time slots are generally utilized as communication resources between plural communicating units, and plural communicating channels are simultaneously required for communicating therebetween.

Frequency Division Multiple Access (FDMA) and Time Division Multiple Access (TDMA) are well known techniques in the multiple access systems.

The typical example of the FDMA system is so called Single Channel Per Carrier (SCPC)-FDMA system, in which a carrier frequency is selected from pooled vacant frequencies to be used as a communicating channel. On the other hand, the TDMA system is the system in which a time slot is selected from pooled vacant time slots to be utilized as a communicating channel.

In these systems, the connection and disconnection of communicating channels are done by using a common signalling channel, separately disposed from the communicating channels. Namely, in the SCPC-FDMA system, a specified carrier frequency, which is different from the communicating channel carrier frequencies, is allotted as the common signalling channel, and in the TDMA system, a specified time slot, which is different from the communicating time slots, is allocated to as the common signalling channel.

These conventional systems have the following problems. Namely, in the SCPC-FDMA system, when the communicating unit "A", which is communicating with another communicating one "B", desires to communicate with further another communicating unit "C", the communicating unit "A" must simultaneously transmit two carriers composed of a communicating channel carrier between the unit "A" and the unit "B", and a common signalling channel carrier for newly occurred channel request, or a new communicating channel carrier between the unit "A" and the unit "C".

When the plurality of carrier frequencies are simultaneously transmitted, a transmitting amplifier simultaneously amplifies a plurality of signals of carrier frequency, which is a multiple frequency amplifying operation. Accordingly, it is necessary to use a linear operating region with the transmitting amplifier having a large operating margin so as to avoid the generation of a distortion of intermodulation product caused by nonlinearity in operation of the transmitting amplifier. In such a situation, the transmitting amplifier is used in a state in which the efficiency is ultimately low. Accordingly, it is necessary to use a transmitter having a large electric power to secure a predetermined transmitting power in accordance with link budget, thereby increasing the cost of the system.

In the TDMA system, traffic between a plurality of communicating units is treated by the common signalling channel and the communicating channel at one frequency so that the transmission rate is ultimately high and the occupied band is increased. Accordingly, it is necessary to use a transmitter having a large power output and an antenna having a large diameter to transmit signals in a wide band in a predetermined power density. Further, digital circuits disposed in control sections, etc., of the TDMA system becomes complicated and the cost of the system is greatly increased.

As mentioned above, in the SCPC-FDMA system and the TDMA system known as the conventional multiple access communication system, when the simultaneous communication with a plurality of partners can be performed, it is necessary to use an expensive transmitter having large output power, thereby increasing the cost of the system.

Further, in the SCPC-FDMA system, the transmission rate of one channel allocated to one carrier frequency is fixed so that a plurality of carrier frequencies must be used to communicate at a carrier speed faster than a predetermined carrier speed and simultaneously communicate with a plurality of communicating units in the bi-direction.

In the TDMA system, a plurality of time slots can be used from multiplexed time slots so that it is possible to simultaneously communicate with a plurality of communicating units in the bi-direction at various speeds. However, this system is an uneconomical system for a user's communicating unit communicated at a low speed. Namely, in the TDMA system, a number of communicating channel time slots are fixedly multiplexed at one carrier frequency so that the transmission rate is much faster than in the SCPC-FDMA system. When the transmission rate is fast, the receiving noiseband is widened and the receiving channel quality is reduced so that it is necessary to increase the transmitting power and use an antenna having a large diameter, thereby making the TDMA control complicated and increasing the cost of the user's communicating unit.

As mentioned above, in the SCPC-FDMA system, it is economical for a user treating only one communicating channel at a predetermined speed, but it is not suitable for communications at various speeds corresponding to simultaneous bi-directional communications with a plurality of communicating units or multi-media which have been required by users. In contrast to this system, in the TDMA system, it is easy to perform simultaneous bi-directional communications with a plurality of communicating units or communicate at various speeds, but the user's communicating unit is expensive and, in particular, the communicating unit is greatly uneconomical for a user who do not need the simultaneous bi-directional communication with a plurality of communicating units. Further, a number of communicating units are disposed in the TDMA system so that the multiplex is increased as the traffic amount is increased, thereby increasing the cost of the user's communicating unit irrespective of the user's requirement.

SUMMARY OF THE INVENTION

To overcome the problems mentioned above, an object of the present invention is to provide a multiple access communication system which can be simultaneously communicated with a plurality of communicating units and is economical.

With the above object in view, the present invention resides in a multiple access communication system for performing the communication between plural communicating units using plural communicating channels and a common signalling channel for establishing and releasing the communicating channels, said system comprising the steps of allocating at least one carrier frequency to the common signalling channel; allocating the carrier frequencies, which are different from the carrier frequency alloted to the common signalling channel, to the communicating channels; forming a time frame composed of first and second time slots by the common signalling channel and communicating channel, respectively; and allocating the first time slot to at least the common signalling channel and the second time slot to the communicating channel.

In another embodiment of the present invention, the present invention resides in a multiple access communication system for performing the communication between plural communicating units by selectively allocation plural carrier frequencies, which are different from the common signalling channel carrier frequency, to the plural communicating channels, and using a common signalling channel for establishing and releasing the communicating channels, said system comprising the steps of constituting a time frame of communicating channel by at least one packet; selecting transmission parameters of the communicating channel including at least transmission speed, packet length and packet position from plural transmission parameters prepared in advance; and setting the selected transmission parameters through the common signalling channel.

BRIEF DESCRIPTION OF THE DRAWINGS

The present invention will be more apparent from the following description of the preferred embodiments thereof in conjunction with the accompanying drawings in which.

DETAILED DESCRIPTION OF THE PREFERRED EMBODIMENTS

The preferred embodiments of the present invention will now be described with reference to the accompanying drawings.

Figure 1:
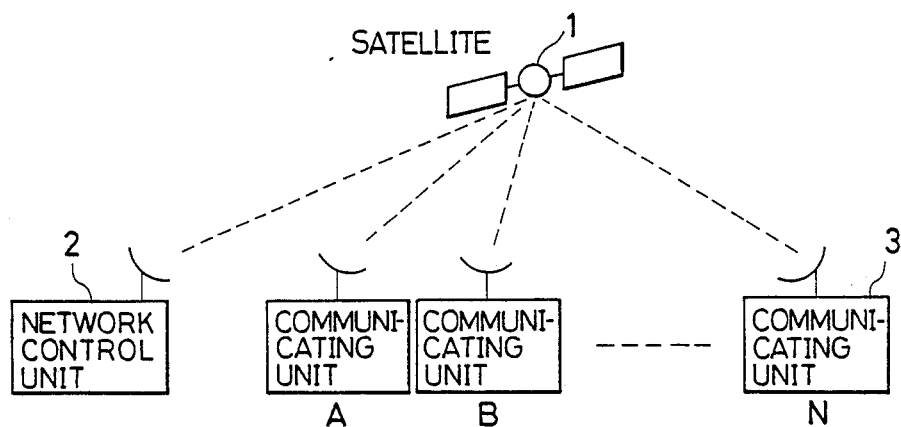
FIG. 1 is a view showing a communication system to which the present invention is applied.

FIG. 1 is a view showing the general construction of a satellite communication system to which the present invention is applied. In this system, a multiple access communication is performed through a satellite 1 by a network control unit 2 and a plurality of communicating units 3 shown by A to N. The network control unit 2 sets and releases a communicating channel required between the communicating units 3 in accordance with the requirement of communication and the release thereof.

Figure 2:
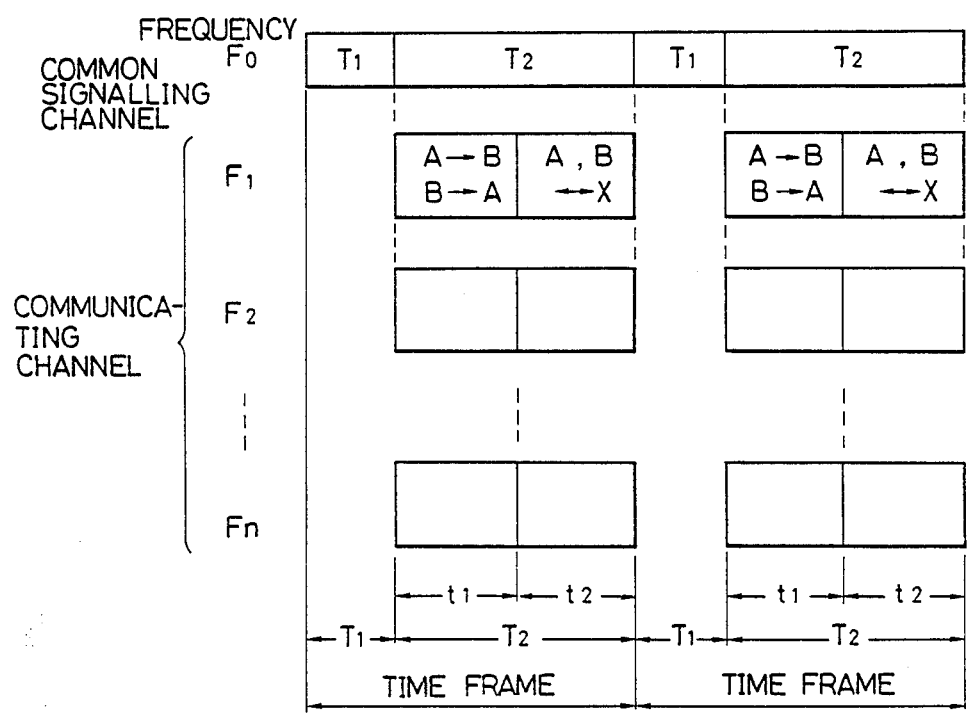
FIG. 2 is a view showing the construction of a time frame for explaining the multiple access communication system in the one embodiment of the present invention.

In the present invention, the communication system shown in FIG. 2 is used when the communication of the system is performed as shown in FIG. 1. In FIG. 2, a carrier frequency F0 is allocated to a common signalling channel, and carrier frequencies F1 to Fn are allocated to a communicating channel.

The common signalling channel and the communicating channel constitute a time frame composed of first and second time slots $T_1$ and $T_2$. The first time slot $T_1$ is used only for the common signalling channel, and the second time slot $T_2$ is used for the common signalling channel with respect to the carrier frequency F0 in this example, and is used for the communicating channel with respect to the carrier frequencies F1 to Fn.

The second time slot $T_2$ in the communicating channel with respect to the carrier frequencies F1 to Fn is divided into two time regions $t_1$ and $t_2$. In this example, the first time region $t_1$ is used for the communication between the communicating units A and B with respect to the second time slot $T_2$ at the carrier frequency F1. The communicating channel set for the communication between the communicating units A and B is called F1-$t_1$ in the following description.

When the communicating units A and B are communicated with each other through the communicating channel F1-$t_1$ and a new communicating unit X begins to communicate with the communicating unit A or B during the communication of the communicating units A and B, this requirement is transmitted to the network control unit 2 through the first time slot $T_1$ allocated to the common signalling channel, and the second time region $t_2$ in the second time slot $T_2$ at the carrier frequency F1 is set as a communicating channel(which is called F1-$t_2$ in the following description) by instructions from the first time slot $T_1$ allocated to the common signalling channel.

The first time slot $T_1$ allocated to the common signalling channel is not used to set a communicating channel with respect to the communicating requirement related to another communicating unit different from the communicating units A and B, but is preferably used first to set a new communicating channel related to the communicating units A and B in which the communicating channel has been already decided, namely, the communicating channel with respect to the communicating requirement between the communicating units A and B and the another communicating unit X.

When the first time slot $T_1$ is used in this way, even when a new communicating requirement is generated during the communication, the carrier frequencies F1 to Fn of the communicating channel and the carrier frequency F0 of the common signalling channel are not simultaneously transmitted as in the conventional SCPC-FDMA system so that it is not necessary to perform the multiple frequency amplification having low efficiency in the transmitting amplifier.

When the communication between the communicating units A and B by the communicating channel F1-$t_1$ has been completed, the requirement for releasing the communication is transmitted to the network control unit 2 through the second time slot $T_2$ allocated to the common signalling channel, preferably the time region $t_1$. Thus, the communicating channel F1-$t_1$ is released by the instructions from the second time slot $T_2$ allocated to the common signalling channel, preferably the time region $t_1$. The second time slot $T_2$ is also allocated to the communicating channel. However, when the second time slot $T_2$ allocated to the common signalling channel is used to release the communicating channel, the carrier frequencies F1 to Fn of the communicating channel and the carrier frequency F0 of the common signalling channel are not simultaneously transmitted since the communication has been completed, so that it is not necessary to perform the multiple frequency amplification in the transmitting amplifier.

Further, when it is necessary to perform a communication different from the communication between the communicating units A and B, the second time slot $T_2$ allocated to the common signalling channel is used to set the communicating channel, and either one of the carrier frequencies F2 to Fn except for the carrier frequency F1 is used as a communicating channel. When the plurality of carrier frequencies are allocated to the communicating channel in this way, the time multiplicity of every carrier frequency is greatly reduced in comparison with the TDMA system. Accordingly, the signal transmission rate does not become ultimately high, and the band is not greatly widened so that the burden in function of the transmitting amplifier and the antenna is reduced and the control circuitry is simplified.

As mentioned above, the second time slot $T_2$ allocated to the common signalling channel is used to release the communicating channel already set, and set a new communicating channel for a communicating unit in which the communicating channel is not set at all. In these functions, the second time slot $T_2$ is preferably used first to especially release the communicating channel.

The present invention is not limited to the embodiment mentioned above. For example, the second time slot $T_2$ allocated to the communicating channel is divided into two time regions $t_1$ and $t_2$ in the above embodiment, but may be divided into more than three time regions.

Further, one carrier frequency is allocated to the common signalling channel, but a plurality of carrier frequencies may be allocated to the common signalling channel such that the frequencies are different from each other with respect to the requirements and instructions.

Further, the bi-directional communication between the communicating units A and B is performed by using the communicating channel of the same carrier frequency F1 in the above embodiment, but carrier frequencies different from each other may be used in the cases of the A to B direction and the B to A direction.

Further, at least one of the first and second time slots $T_1$ and $T_2$ allocated to the common signalling channel may be further divided into a plurality of time slots to receive a plurality of common signalling channels.

As mentioned above, in the present invention, a plurality of carrier frequencies different from a carrier frequency allocated to a common signalling channel are allocated to a communicating channel. The common signalling channel and the communicating channel constitute a time frame composed of two time slots. A first time slot is allocated to only the common signalling channel, and a second time slot is allocated to at least the communicating channel. The second time slot allocated to the communicating channel is divided into a plurality of time slots to receive a plurality of communicating channels so that the common signalling channel can be used at any time, and a new communicating channel can be set even during the communication in accordance with another communicating requirement, thereby performing a simultaneous transmission with a plurality of communicating units and switching to a communicating unit to be communicated prior to the others.

In these cases, only one carrier frequency is transmitted at any time so that the transmitting amplifier can be used in a state in which the efficiency is high. Further, a plurality of carrier frequencies are prepared and the time multiplicity is thereby reduced so that the transmission rate does not become greatly high and, as a result, the band is not widened. Accordingly, it is not necessary to dispose a transmitter having a large power and an antenna having a large diameter so that digital control circuitry is simplified and the system becomes cheap.

As mentioned above, the present invention provides an economical multiple access communication system for enabling simultaneous communication with a plurality of partners.

Figure 3B:
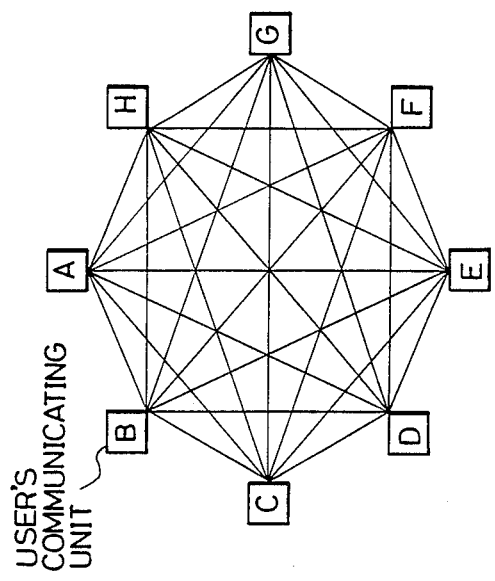
FIGS. 3A and 3B are views showing examples of communicating networks to which the present invention is applied.
Figure 3A:
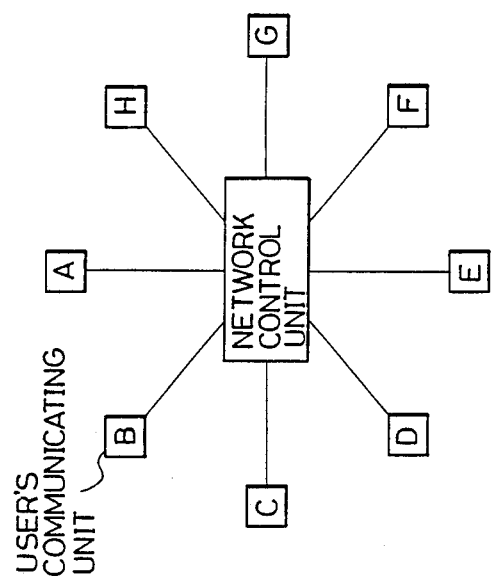

FIG. 3A shows a star-type communicating network to which the present invention is applied in another embodiment thereof.

Each of user's communicating units A to H call a line control unit LCU through a common signalling channel and require a transmission rate and a packet length of a communicating channel through the common signalling channel. The line control unit LCU allocates to each of the user's communicating units a carrier frequency used in the communicating channel, the transmission rate and packet length and a packet position per carrier frequency through the common signalling channel based on the requirement from each of the user's communicating units, thereby setting the communicating channel. Each of the user's communicating units communicates with another communicating unit by the allocated communicating channel. When the talking communication has been completed, each of the user's communicating units informs the line control unit of the completion through the common signalling channel, and of releasing the communicating channel through the common signalling channel.

Figure 4:
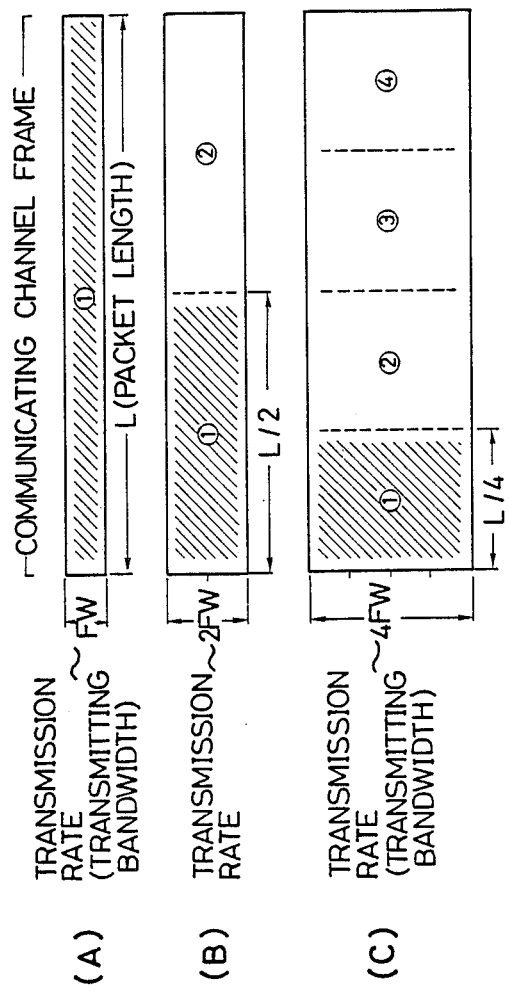
FIG. 4 is a view showing the relation between transmission rate and packet length of a communicating channel per carrier frequency.

FIG. 4 shows the relation between the selective transmission rate and packet length in the communicating channel per carrier frequency.

In section (a) of FIG. 4, a communicating channel frame is constituted in mode 1 by the transmission rate(-transmitting bandwidth) Fw, one unit packet of the packet length L where the unit of information transmission is designated by $P = Fw \times L$.

In section (b) of FIG. 4, the communicating channel frame in mode 2 is divided into two unit packets having packet length L/2 and transmission rate 2Fw where the unit of information transmission is designated by P. In section (c) of FIG. 4, the communicating channel frame in mode 3 is divided into four unit packets having packet length L/4 and transmission rate 4Fw.

Each of the user's communicating units of FIG. 3A selects communicating channel transmission parameters of a plurality of transmission rates and packet lengths prepared in advance as shown in FIG. 4, and requires the allocation of the line to the line control unit LCU through the common signalling channel.

For example, when the user's communicating unit A of FIG. 3A would like to communicate with the user's communicating unit B at speed P such as 64Kb/s, the mode 1 of FIG. 4(a) is required. When the user's communicating unit A would like to simultaneously communicate with the user's communicating units C and D at speed P, the mode 2 of FIG. 4(b) is required. When the user's communicating unit A would like to simultaneously communicate with the user's communicating units E, F, G, and H at speed P, the mode 3 of FIG. 4(c) is required. Further, when the user's communicating unit A would like to communicate with the user's communicating unit B at speed-2P, the mode 2 of FIG. 4(b) is required and the two packets are used between the communicating units A and B. When the user's communicating unit A would like to communicate with the user's communicating unit B at speed 4P, the mode 3 of FIG. 4(c) is required and the four packets are used between the communicating units A and B. Also, when the mode 3 of FIG. 4(c) is required, the user's communicating unit A can simultaneously communicate with the user's communicating unit B at speed 2P and the user's communicating units C and D at speed P. When the user's communicating units A and B would like to communicate with another communicating unit while the communicating units A and B are communicated with each other, a carrier frequency different from the one used between the communicating units A and B is allocated.

As mentioned above, the simultaneous bi-directional communication between a plurality of communicating units and the communication at multiple speeds can be performed when the user's communicating units select and require at least the communicating channel transmission parameters of a plurality of transmission rates and packet lengths prepared in advance. Further, the system can easily correspond to the increases of the number of user's communicating units and the traffic amount without the increase of the multiplicity.

In the above embodiment, the transmission parameter is selected and required by the user's communicating units. However, when the line control unit LCU knows the average traffic of the individual user's communicating units and the traffic situation every time, each of the user's communicating units may require a necessary information transmitting unit nP where numeral n is an integer, or an integer composed of powers of 2, etc., and the line control unit LCU may select a transmission rate, a packet length and a packet position from a plurality of transmission parameters prepared in advance, and may allocate them to each of the user's communicating units through the common signalling channel. Although the user's communicating units select and require the transmission parameters, in some cases, the line control unit LCU may hold the required information transmitting unit by the utilized efficiency of carrier frequency and packet, and select and allocate the transmission rate and packet length different from those required by the user's communicating units.

In the above embodiment, the line control by the common signalling channel is performed by the star-type communicating network shown in FIG. 3A. However, the present invention can be applied to a line control of a mesh-type communicating network shown in FIG. 3B when each of the user's communicating units memorizes the carrier frequency, transmission rate, packet length and packet position used in the system, and has a control table in which the content of the table is updated in accordance with the change of the situation of the system. In this case, each of the user's communicating units has a control function and can select and directly allocate transmission parameters to another user's communicating unit through the common signalling channel. The communicating channel may be constituted by either the star-type communicating network of FIG. 3A or the mesh-type communicating network of FIG. 3B.

Figure 5:
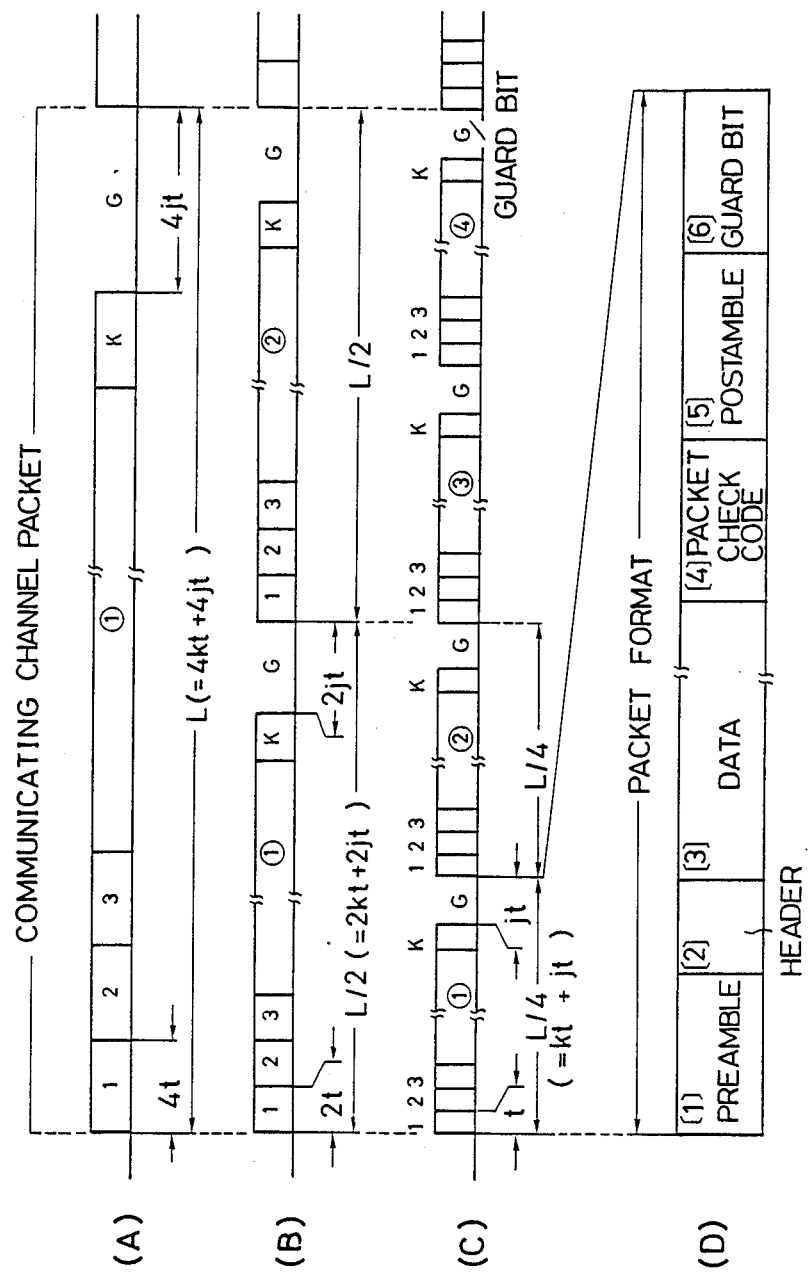
FIG. 5 is a view showing the detailed construction of the packet division of the communicating channel.

Sections (a) and (b) of FIG. 5 show a bit construction and explains in detail the division of the packet of the communicating channel frame of sections (a) and (b) of FIG. 4.

As shown in FIG. 5(a), the communicating channel frame is constituted by (k+j) bit where j bit is a guard bit, and the packet length becomes $L = 4t \times (k+j)$ when one bit time length is 4t. When the transmission rate is twice, and as shown in FIG. 5(b), the communicating channel frame can be separated and divided into two packets having length $L/2 = 2t \times (k+j)$ when the one bit time length is 2t. Further when the transmission rate is four times, as shown in FIG. 5(c), the communicating channel frame is separated and divided into four packets having length $L/4 = t \times (k+j)$ when the one bit time length is t. When the guard bit length at a predetermined maximum transmission rate, i.e., $t \times j$ of FIG. 5(c) in this case, is selected to be a synchronously controlled value, the packet of the communicating channel frame can be divided with no problems.

FIG. 5(d) shows a typical construction of the packet constituted by a preamble for the synchronization of the carrier frequency and bit timing and error correcting numerals, a header showing calling and answering communicatihg units, and a postamble for packet check numerals for detecting errors of numerals in transmitted and received data and error correcting numerals.

Figure 6:
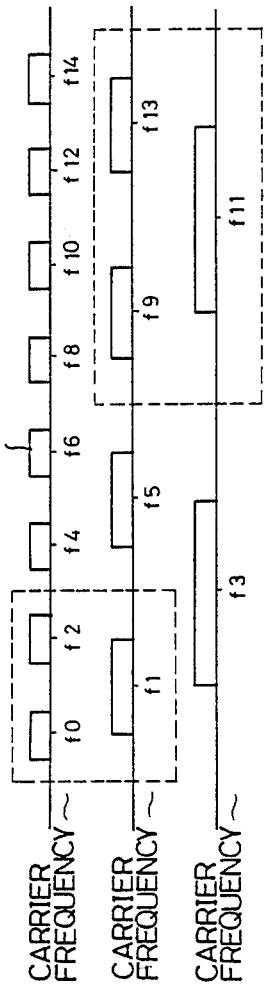
FIG. 6 is a view showing an example of the allocation of the carrier frequency with respect to the packet with multiple transmission rate.

FIG. 6 shows an example of the allocation of the carrier frequency prepared in advance with respect to the multiple transmission rate packet.

In accordance with the communicating channel transmission rate of FIG. 4(a), the transmitting bandwidth of FIG. 4(b) is twice, and the transmitting bandwidth of FIG. 4(c) is four times. Therefore, when the interval of the carrier frequency is $\Delta f$ and $fi = f0 + i \times \Delta f$ where numeral i is an integer, the carrier frequencies f0, f2, f4, ... f2i shown in FIG. 6(a) are allocated to the communicating channel of FIG. 4(a), and the carrier frequencies f1, f5, f9, ... f(1+4i) of FIG. 6(b) are allocated to the communicating channel of FIG. 4b, and the carrier frequencies f3, f11, f19, ... f(3+8i) of FIG. 6(c) are allocated to the communicating channel of FIG. 4(c).

When the carrier frequencies f(1+4i) of FIG. 6(b) are allocated, the carrier frequencies f(1+3i) and f(1+5i) of FIG. 6(a) are not used. When the carrier frequencies f(3+8i) of FIG. 6(c) are allocated, the carrier frequencies f(3+6i) and f(3+10i) of FIG. 6(b), and the carrier frequencies f(3+5i), f(3+7i), f(3+9i) and f(3+11i) of FIG. 6(a) are not used.

Figure 7:
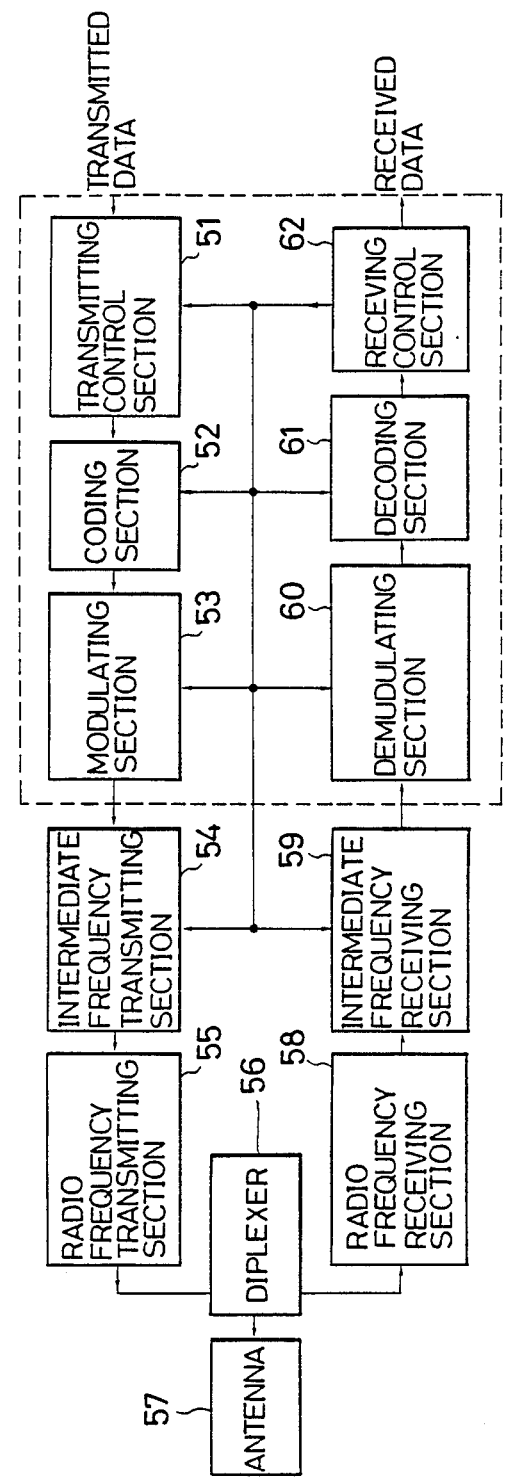
FIG. 7 is a view showing an example of the construction of a user's communicating unit.

FIG. 7 shows an example of the construction of each of the user's communicating units used in the satellite communication in FIG. 3A. A transmitter is constructed by a transmitting control section 51, a coding section 52, a modulating section 53, an intermediate frequency transmitting section 54 and a radio frequency transmitting section 55. A high frequency signal is transmitted from an antenna 57 through a diplexer 56 to a satellite. A high frequency signal from the satellite is received by the antenna 57 and is supplied as receiving data by a receiver through the diplexer 56. The receiver is constituted by a radio frequency receiving section 58, an intermediate frequency receiving section 59, a demodulating section 60, a decoding section 61, and a receiving control section 62. The modulating and demodulating sections and the coding and decoding sections shown by broken line of FIG. 7 may be of a known digital type in which the speed is changed by an external control.

Information required to call is outputted from the transmitting control section 51 in accordance with the construction of the common signalling channel at a predetermined transmission rate, and the calling signal is set to be at an intermediate carrier frequency for the common signalling channel by the intermediate frequency transmitting section 54, and is then transmitted. The transmission parameters of the communicating channel allocated by the line control unit LCU are read and memorized by the receiving control section 62 through the intermediate frequency receiving section 59 set at the intermediate carrier frequency for the common signalling channel. The allocated transmission rate, packet length and packet position within the broken line of FIG. 7 are set at the intermediate carrier frequency for the communicating channel allocated by the intermediate frequency transmitting and receiving sections 54 and 59. The modulating and demodulating sections 53 and 60 have a known analog filter for changing the band by an external control, and the transmitting signal bandwidth and the receiving signal bandwidth are set in accordance with the allocated transmission rate.

Accordingly, the receiving noise band of mode 2 of FIG. 4(b) is half that of mode 3 of FIG. 4(c), thereby improving the receiving channel quality by 3 dB. Similarly, mode 1 of FIG. 4(a) can be improved by 3 dB in receiving channel quality in comparison with mode 2 of FIG. 4(b). By using such construction, the transmission parameters can be selected and set in accordance with the traffic and transmitted information and the situation of attenuation due to rain-fall, and the channel quality can be suitably selected.

Figure 8:
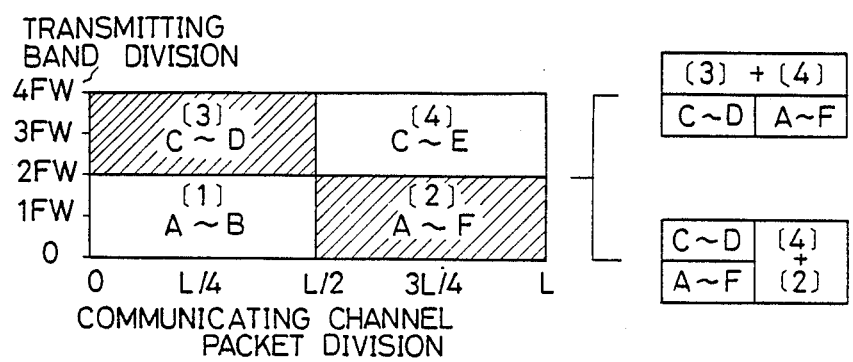
FIG. 8 is a view showing an example of utilization scheme for frequency resource in accordance with the present invention.

FIG. 8 shows another embodiment of the present invention in which frequency source is effectively utilized.

When the communication of packets [1] and [4] are completed while the user's communicating units A, B, C, D, E, and F communicate with each other as shown in FIG. 8 using packets [1] to [4], the positions of packets [3] and [4] and packets [2] and [4] are released by resetting the position of packet [3] to that of packet [1], or the position of packet [2] to that of packet [1], thereby corresponding to the requirement of the information transmitting unit $2P=2Fw \times L$ without allocating a new carrier frequency.

Figure 9:
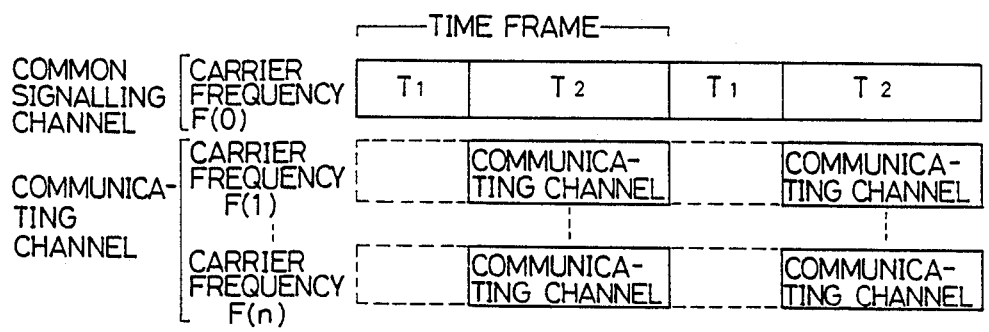
FIG. 9 is a view showing an example of the common signalling channel structure.

The transmission parameters during the talking communication as in FIG. 8 can easily be reset by using the common signalling channel instead of two carrier frequencies if the common signalling channel and the communicating channel are constructed as shown in FIG. 9. In FIG. 9, a time frame is composed of times $T_1$ and $T_2$, and all the user's communicating units are switched to the carrier frequency F(0) during time $T_1$ to transmit and receive the common signalling channel.

When the communication of packets [1] and [4] has been completed in FIG. 8, the line control unit LCU give instructions for changing the packet position to the user's communicating units A, C, D, and F after a fixed time frame using the common signalling channel having time T1. The user's communicating units A, C, D, and F memorize these instructions in the receiving control section 62 of FIG. 7, and operate a counter and change to transmitting and receiving packet positions after the fixed time frame.

FIGS. 10 to 13 are views for explaining a packet divisional method which can be prepared in advance in the case of transmitting bandwidth 4Fw for example, and a plurality of simultaneously communicable forms in this packet division and the receiving channel quality or receiving bandwidth of the communicating channel.

Figure 10:
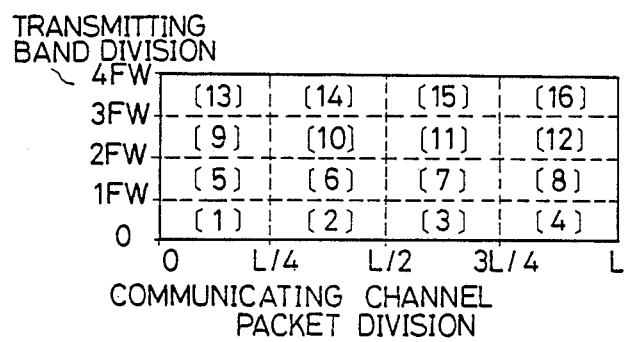
FIG. 10 is a view explaining the packet division method of the communicating channel.
Figure 11:
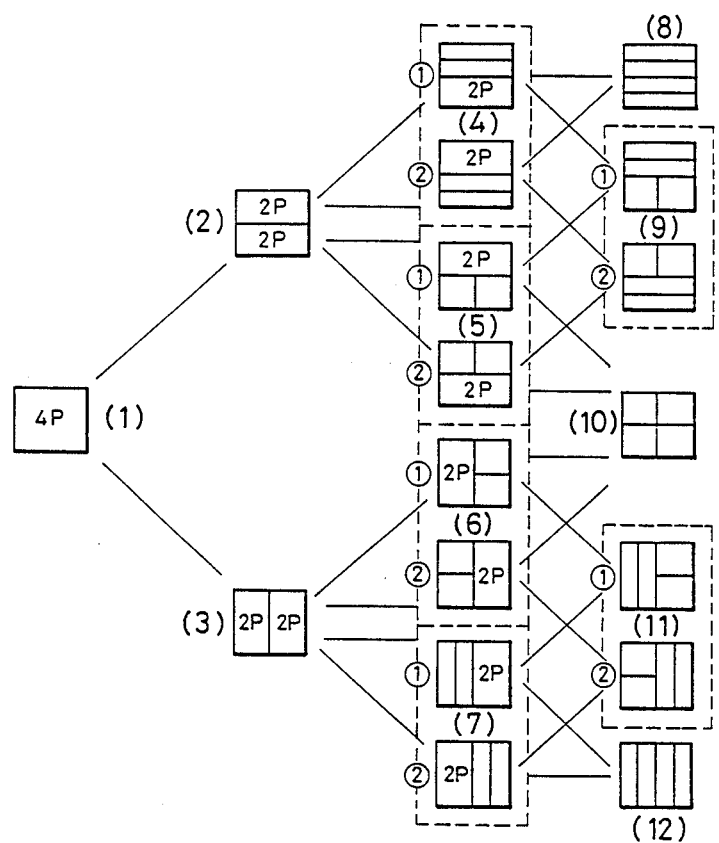
FIGS. 11, 12 and 13A to 13E are views for explaining communicating forms and channel quality corresponding to dividable forms of the communicating channel packet.
Figure 12:
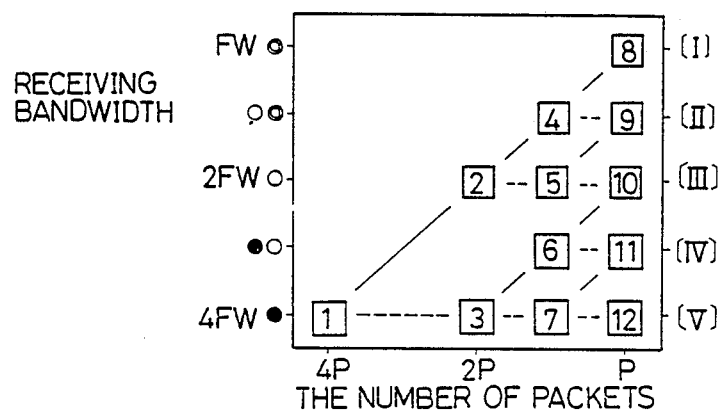
Figure 13A:
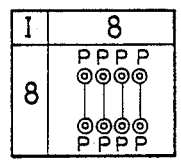
Figure 13B:
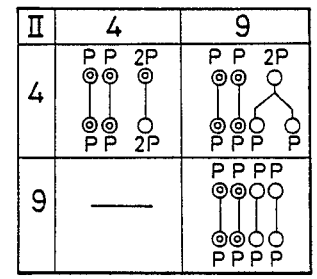
Figure 13C:
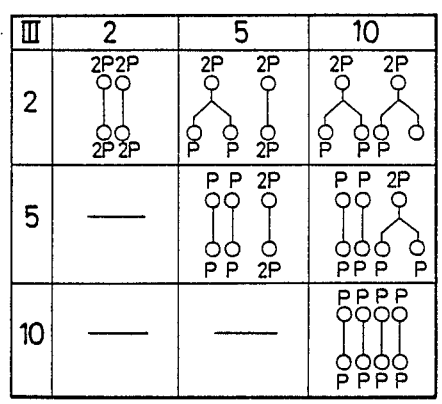
Figure 13D:
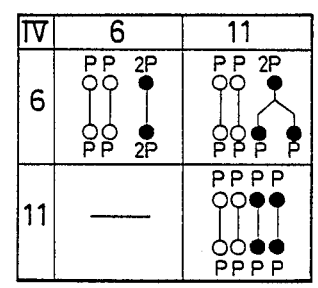
Figure 13E:
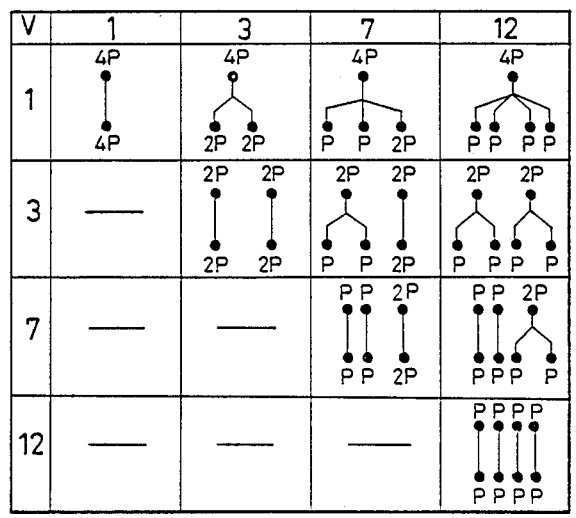

The packet division of the transmitting bandwidth 4Fw and the communicating channel is performed by forming 4, 8 and 16 packets with the packets [1] to [16] of FIG. 10 adjacent to each other. FIG. 11 shows such a divisional method, and FIG. 12 shows the relation between the receiving bandwidths of packets obtained by the division of FIG. 11 and the information transmitting units P, 2P and 4P which can be used in user's communicating units for treating only one carrier frequency. FIG. 13A to 13E show the receiving bandwidth of the packets and the information transmitting units corresponding to the individual division and a plurality of simultaneously communicable forms which can be received in the system.

From FIG. 12 and FIGS. 13A to 13E, the communicating forms are limited to 1:1 in the case of the numbers of packets 8, 4, 2, 1 by the frequency division although this form has the best receiving channel quality. On the other hand, the numbers of packets 12, 7, 3 by the time division can correspond to various kinds of communicating forms although the receiving channel quality is worse than that of the former form by the frequency division. Accordingly, the transmission parameters of the communicating channel including at least transmission rate, packet length and packet position are selected from a plurality of transmission parameters prepared in advance and are set through the common signalling channel, thereby freely corresponding to various kinds of communicating forms, various kinds of transmission rates corresponding to multi-media., various kinds of line situations such as attenuation due to rain-fall with a minimum multiplicity.

Further, the transmission parameters can be constructed to include a coding structure for error correction, etc., as well as the transmission rate, packet length and packet position. A certain error correcting coded numeral having a high gain therefor is often used to improve the channel quality, and make an antenna compact and economical in the satellite communication. When the coding rate is set and changed at a fixed transmission rate, the information amount which can be transmitted per one packet can be changed.

When one bit information amount is coded by coding rate $\alpha$ and is converted to bit $K=I/\alpha$ where I is an information amount, and is received in time slot length of time interval S and is then transmitted, the information rate is K/S (b/s).

When bit K is stored, the coding rate is changed to another coding rate $\beta$ and an information amount J can be transmitted. Table 1 shows the results of the calculation of transmittable information amounts I and J in which bit K is designated in the longitudinal direction, and the coding rates $\alpha$ and $\beta$ are designated in the transversal direction.

TABLE 1

| INFORMATION RATE (kb/s) | CODING RATE 1/2 | 2/3 | 3/4 | 7/8 |
|---|---|---|---|---|
| 1  | 512 | 256 | —   | 384        | 384 + 64      |
| 2  | 256 | 128 | —   | 126 + 64   | 128 + 64 + 32 |
| 3  | 128 | 64  | —   | 64 + 32    | 64 + 32 + 16  |
| 4  | 64  | 32  | —   | 32 + 16    | 32 + 16 + 8   |
| 5  | 32  | 16  | —   | 16 + 8     | 16 + 8 + 4    |
| 6  | 768 | 384 | 512 | 144 × 4    | —             |
| 7  | 384 | 192 | 256 | 144 × 2    | —             |
| 8  | 192 | 96  | 128 | 144 = 64 × 2 + 16 | —      |
| 9  | 96  | 48  | 64  | 64 + 8     | —             |
| 10 | 48  | 24  | 42  | 32 + 4     | —             |

From Table 1, the information rate is same with respect to a first case in which information amount 256 kb/s is transmitted at coding rate 1/2, and a second case in which information amount 384 kb/s is transmitted at coding rate 3/4. Accordingly, a conference using television for example can be held at speed 384 kb/s by the international standard using packet which can transmit information amount 256 kb/s at coding rate 1/2. when the coding rate is changed to 7/8, the television conference can be held at speed 384 kb/s and simultaneously a still picture often required in the conference can be transmitted at speed 64 kb/s as shown in item 1 of Table 1. Similarly, when the packet transmittable the information amount at transmission rate 192 kb/s and coding rate 1/2 is used in accordance with item 7 of Table 1, the information can be transmitted at ISDN basic access speed 144 kb/s by changing the coding rate to 1/2. In the satellite communication, a punctured system based on a certain decoder normally at coding rate 1/2 is often used to decode error correction at the coding rate greater than 7/8.

Thus, the system has a greatly improved convenience for the users by setting and changing the coding rate using the common signalling channel and the packet header of the communicating channel shown in FIG. 6. Further, in this case, the information rate is not changed so that there are no effects on the other communicating channels. Accordingly, even when all the information rates are used in Table 1, the basic speeds can be united as two speed systems 32 kb/s and 48 kb/s.

The present invention is not limited to the embodiments, mentioned above, but may be changed in various modifications within the scope of the invention.

As mentioned above, in accordance with the present invention, the following effects can be obtained.

(1) The simultaneously bi-directional communication with a plurality of communicating units and the communication at various transmission rates corresponding to multi-media can be easily performed by an economical user's communicating unit.

(2) Since the user's communicating unit treats only a communicating channel related to the user, the processing speed of the user's communicating unit can be reduced so that the communicating unit is economical and the receiving channel quality is improved.

(3) The system can correspond to the increase of the number of subscribers and the traffic of the system without changing the processing speed, transmitting band and channel quality of the user's communicating unit, thereby facilitating the construction of the system.

(4) The transmission rate, communicating form and channel quality in accordance with user's requirement can be selected from the user's communicating unit.

(5) The channel quality can be selected in accordance with the change of the line situation by attenuation due to rain-fall.

(6) The resources of frequency and time slot can be effectively utilized.

(7) The information amount transmittable per packet can be set and changed in accordance with the user's requirement without changing the transmission rate.

(8) The kinds of the transmission rates within the system can be simplified and united.

(9) The system can be applied to both star-type and mesh-type communicating networks.

What is claimed is:

1. A multiple access communication system for communicating between plural communicating units using plural communicating channels and a common signalling channel for establishing and releasing the communicating channels, said system comprising the steps of:

allocating at least one carrier frequency to the common signalling channel;

allocating the carrier frequencies, different from the carrier frequency allotted to the common signalling channel, to the communicating channels;

forming a time frame composed of first and second time slots by the common signalling channel and communicating channel respectively; and allocating the first time slot to at least the common signalling channel through which transmission parameters of the communicating channel including at least one of transmission speed, packet length and packet position are supplied, and the second time slot to the communicating channel.

2. A multiple access system as claimed in claim 1, wherein the second time slot is divided into plural time slots in order to communicate between one communicating unit and the other plural communicating units.

3. A multiple access system as claimed in claim 1, wherein the first time slot allocated to the common signalling channel is first used to establish a new communicating channel related to the communicating unit, in which a communicating channel is already established.

4. A multiple access system as claimed in claim 1, wherein the second time slot is also allocated to the common signalling channel, and is first used to release the communicating channel.

5. A multiple access system as claimed in claim 1, wherein the second time slot is also allocated to the common signalling channel, and is used to establish a communicating channel related to the communicating unit, in which no communicating channel is established.

6. A multiple access system as claimed in claim 1, wherein at least one of the first and second time slots allocated to the common signalling channel is divided into plural time slots in order to receive plural common signalling channels.

7. A multiple access system as claimed in claim 1, wherein plural carrier frequencies, which are allocated to common signalling channel, are prepared.

8. A multiple access communication system for communicating between plural communicating units by selectively allocating plural carrier frequencies, which are different from the common signalling channel carrier frequency, to the plural communicaitng channels, and using a common signalling channel for establishing and releasing the communicating channels, said system comprising the steps of:

constituting a time frame of a communicating channel by at least one packet;

selecting transmission parameters of the communicating channel including at least one of transmission speed, packet length and packet position from plural transmission parameters prepared in advance; and setting the communicating channel in accordance with the selected transmission parameters which are supplied through the common signalling channel.

9. A multiple access system as claimed in claim 8 wherein the transmission parameters of the communicating channel are set by a line control unit based on the requirement from a user's communicating unit through the common signalling channel.

10. A multiple access system as claimed in claim 8, wherein the transmission parameters of the communicating channel are set by the user's communicating unit.

11. A multiple access system as claimed in claim 8, wherein the user's communicating unit selects and sets the receiving bandwidth from the plural parameters prepared in advance in accordance with the transmission speed transmitted through the common signalling channel.

12. A multiple access system as claimed in claim 8, wherein the transmission parameters of the communicating channel are changed in accordance with the parameters in a header of the common signalling channel or the communicating channel under the communicating period.

13. A multiple access system as claimed in claim 8, wherein the transmission parameters of the communicating channel include a coding structure of the communicating channel, 14. A multiple access communication system for communicating between plural communicating units by selectively allocating plural carrier frequencies, which are different from the common signalling channel carrier frequency, to the plural communicating channels, and using a common signalling channel for establishing and releasing the communicating channels, said system comprising the steps of:

forming a time frame composed of first and second time slots by the common signalling channel and communicating channel;

allocating the first time slot to at least the common signalling channel and the second time slot to the communicating channel;

constituting a time frame of a communicating channel by at least one packet;

selecting transmission parameters of the communicating channel including at least one of transmission speed packet length and packet position from plural transmission parameters prepared in advance; and setting the communicating channel in accordance with the selected transmission parameters which are supplied through the common signalling channel.

15. A multiple access system as claimed in claim 14, wherein the second time slot is divided into plural time slots in order to communicate between one communicating unit and the other plural communicating units.

16. A multiple access system as claimed in claim 14, wherein the transmission parameters of the communicating channel are set by a line control unit based on the requirement from a user's communicating unit through the common signalling channel.

* * * * *